United States Patent [19]

Bizzigotti et al.

[11] 3,768,098

[45] Oct. 23, 1973

[54] SYSTEM FOR SURVEILLANCE OF OCEAN DUMPING

[75] Inventors: Pio J. Bizzigotti, Dix Hlls; John Charlton, Syosset, both of N.Y.

[73] Assignee: Sperry Rand Corporation, New York, N.Y.

[22] Filed: Sept. 6, 1972

[21] Appl. No.: 286,633

[52] U.S. Cl.................... 343/103, 346/8, 346/33, 325/311
[51] Int. Cl............................ G01s 1/24, G01d 9/28
[58] Field of Search ...................... 346/8, 14, 20, 25, 346/33, 80; 325/311; 343/103, 112 PT, 5 PC

[56] References Cited
UNITED STATES PATENTS
2,610,226  9/1952  Klaasse et al...................... 343/5 PC
3,082,423  3/1963  Chiocca............................ 346/14 R Primary Examiner—Benjamin A. Borchelt
Assistant Examiner—S. C. Buczinski
Attorney—Howard P. Terry

[57] ABSTRACT

A system for determining if ocean dumping of waste materials by licensed vessels occurs in other than assigned areas utilizes Loran receiving means for providing electrical signals indicative of the vessel's position. The Loran signals are applied to a recorder in which permanent records of the Loran signals are entered at specified times in response to Print Command signals from a command unit. The command unit contains a plurality of input switches which are actuated during the occurrence of specified events such as the beginning of an actual dump operation, to produce a Print Command signal and an identifying signal indicative of the particular switch that was actuated as well as a clock signal indicative of the time of occurrence of the recorded event. The resulting record of an entire voyage is suitable for submission to the licensing agency for their review.

6 Claims, 1 Drawing Figure

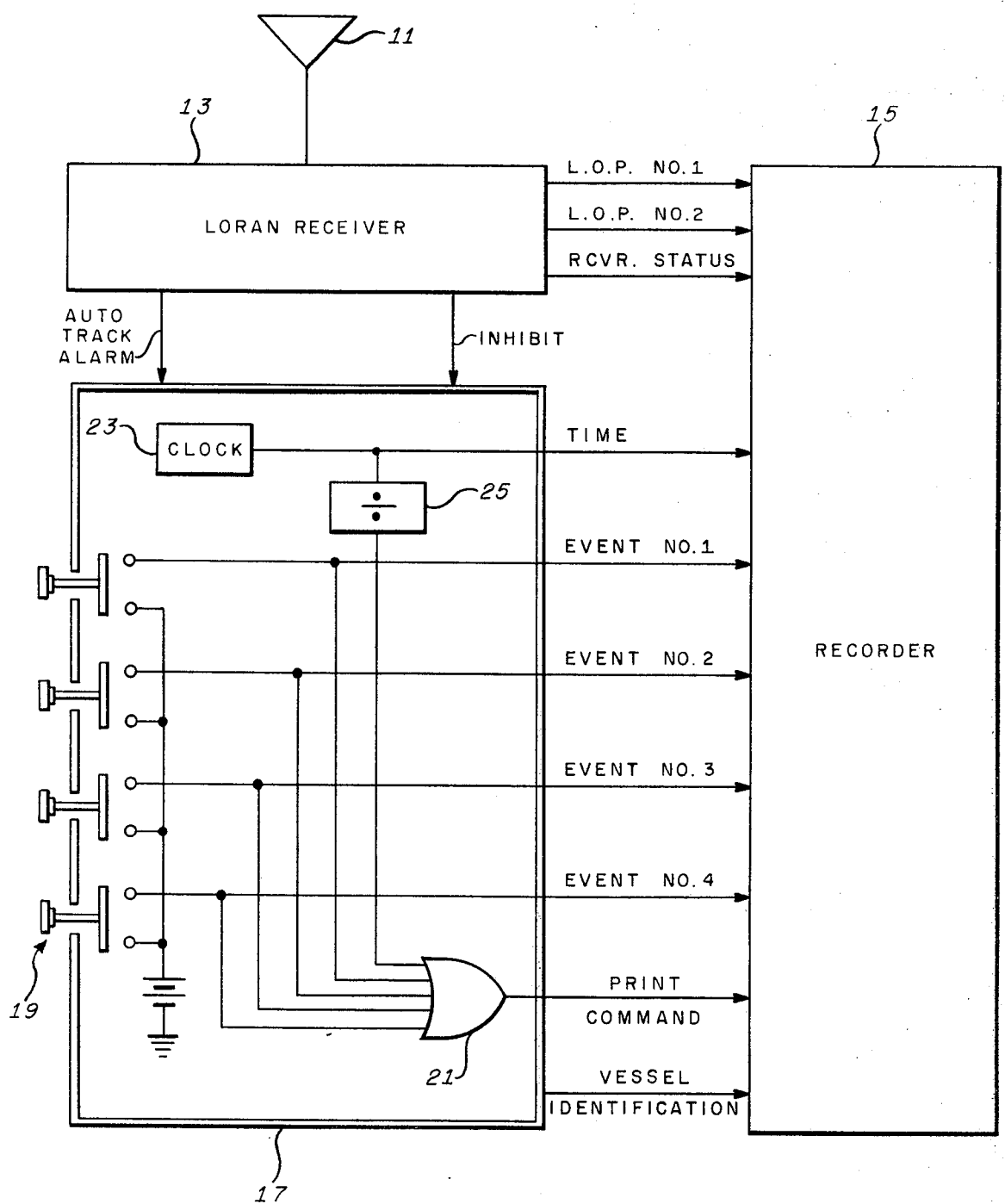

3,768,098

SYSTEM FOR SURVEILLANCE OF OCEAN DUMPING

BACKGROUND OF THE INVENTION

1. Field of the Invention

The invention relates to surveillance systems and more specifically to surveillance systems for providing a permanent record of the events occurring during a vessel's voyage.

2. Description of the Prior Art

The proper disposal of waste materials is becoming an increasingly urgent problem. In some geographical areas, such as New York City, waste material is loaded on barges which are then towed to designated locations in the ocean and dumped.

An agency of the U.S. Government has the responsibility of granting permission for the dumping of wastes in the ocean. Permits are issued which authorize the dumping of wastes in specific dump areas according to the nature of the waste material. Ocean dumping is believed to be occurring in locations other than the prescribed dump areas. However, the extent and type of violations is not exactly known because of the present lack of a suitable monitoring system. Although rough seas and generally bad weather are likely conditions for early dumping, it is suspected that violations are often attributable to causes other than safety considerations or emergency conditions.

For many reasons, including the deleterious impact of such practices on the environment, it is highly desirable that the dumping of wastes be limited to the areas specified in the permits and applicable regulations. Violations are punishable by the imposition of severe fines and the irrevocation of permits. However, the imposition of such sanctions requires convincing evidence that the alleged violations actually occurred. The present invention involves means for obtaining such evidence.

SUMMARY OF THE INVENTION

A permanent record of a vessel's location during the occurrence of specified events is compiled by employing a Loran receiver aboard the vessel and applying the electrical output signals from the Loran receiver to a recording means during time intervals when the specified events occur. A simultaneous record of the time, nature of the recorded event and Loran receiver output signals is made so that the record can be later scrutinized by the appropriate authority.

BRIEF DESCRIPTION OF THE DRAWING

The single drawing is a block diagram illustrating the principles of the invention.

DESCRIPTION OF THE PREFERRED EMBODIMENT

The principal shipboard components of the system are illustrated in the FIGURE. A receiving antenna 11 supplies signals to a Loran receiver 13. The resulting output signals from the Loran receiver 13 are applied to a recorder 15 and a command unit 17. Signals from the command unit 17 are also applied to the recorder as indicated.

The antenna 11 may be any suitable receiving antenna and would typically be in the form of a 15 foot vertical whip.

The Loran receiver is conventional and may typically comprise a pair of commercially available Loran A Model 500 "Autofix" receivers manufactured by the Nautical Electronics Laboratories.

As is well known in the art, a Loran receiver produces a first "LOP" signal indicative of an imaginary line-of-position on which the receiver is located, with respect to a first pair of transmitting stations. The receiver also produces a second "LOP" signal indicative of a second imaginary hyperbolic line-of-position on which the receiver is located, with respect to a second pair of transmitting stations. The geographic location of the receiver is calculated by determining the intersection of the two imaginary hyperbolic lines-of-position.

As illustrated in the accompanying FIGURE, the Loran receiver of the present invention provides two output signals (LOP 1 and LOP 2) to the recorder 15. For the Loran receivers previously mentioned, each of the LOP signals is in the form of a four digit binary coded decimal. The receiver also provides a receiver status signal to the printer for continuous recording on the receiver status. The same receivers also provide a print inhibit output signal which inhibits the formation of a Print Command signal so that recording is not attempted during the interval when the Loran line-of-position registers are being updated. An automatic track alarm signal is also available from the particular Loran receivers so as to provide a warning should loss of track occur.

The recorder 15 may be a commercially available Event Recorder such as the Model 800 Event Recorder available from Newport Laboratories. Such a recorder is a 21 column printer which provides a print-out of the data in various columns on a paper tape. The unit responds to parallel entry, binary coded deciminal signals.

Information is entered into the recorder in response to a Print Command signal from the command unit 17. The command or "events" unit consists basically of a straightforward switching means. The command unit has been shown only in functional form in the FIGURE to illustrate the principles of the invention. The command unit contains a bank of input switches 19 which may be manually actuated. Closure of any one of the switches in the bank 19 produces a unique identifying signal on an associated output line and also acts through an OR circuit means 21 to produce a Print Command signal which orders the recorder 15 to record all signals being applied to its input terminals at that time.

The command unit 17 further contains a clock means 23 which produces relative time signals indicating the time at which each recording is made.

The various input switches are actuated upon the occurrence of specified events. Thus, the top switch corresponding to event number 1, may be actuated according to a prearranged schedule at the time the vessel is leaving the dock. The second switch, corresponding to event number 2, may be actuated when the vessel is abeam a given fixpoint. The third switch, corresponding to event number 3, may be actuated upon the commencement of the dump and the bottom switch, corresponding to event number 4, may be actuated upon the completion of the dump.

Although only four input switches have been illustrated for purposes of explanation, any convenient number of input switches may be included in the system. The input switches may, for example, be manually actuated pushbuttons or switches which are automatically actuated in response to the given event. Thus, switches corresponding to the commencement and termination of a dump may be actuated automatically from the dump mechanism. More elaborate systems might conveniently employ a draft sensor connected to sea pressure and a series of pressure switches preset to switch in sequence at specified fractions of a full load. The switch outputs can then provide discrete signals for appropriate recording on one channel of the printer.

It can thus be seen that the time of occurrence of any prearranged event as well as the geographical location of the vessel at that time can be readily recorded with the system of the present invention.

If desired, a further signal uniquely identifying a particular vessel may be generated in the command unit 17 and recorded in the recorder 15.

In addition to recording time and vessel position during the occurrence of the various events, it is usually desirable to record intermediate periodic positions. This may be accomplished by dividing the clock output signal in a suitable frequency divider means 25 so as to produce periodic Print Command signals. In a typical surveillance system, for instance, a Print Command signal may be produced every six minutes during the voyage and every fifteen seconds for a period of two minutes immediately following each "Event."

In a typical operation, the vessel's captain initially writes identifying information on the paper tape which will form the record of the voyage. The captain then tunes the Loran receivers so as to acquire two preselected master Loran signals. The Loran receivers automatically acquire the slave signals and automatically track, thus providing and continuously updating the two Loran lines-of-position. The printer automatically records the two lines-of-position and time each 6 minutes as determined by the clock in the command unit. When any of the pre-selected events occur, the captain depresses the appropriate input button so as to record the time and vessel's position. Whenever an input button is depressed, the normal 6 minute recording period is interrupted and the specific event is recorded by the printer along with the time of occurrence. A complete set of data is recorded at 15 second intervals for a two minute period following the closure of an input switch.

Upon his return to port, the captain enters the date, time, and place, and signs the printed tape thus certifying that the data was recorded on the specific trip and was not manipulated in any way. He then delivers the data within a specified time to the concerned government authorities.

The data delivered to the authorities is briefly reviewed to reveal suspects, and then examined in detail for any dump suspected of being improper.

The printed data provides a complete timed history of the entire dump mission. The continuous timed record of vessel position with indications of specific locations at specified times would be very difficult to fabricate, manipulate, or falsify. In addition, the printout is in the English language with only a simple coding for events so that the captain can make an intelligent review, thereby making his signature more meaningful.

It will be noted that in the basic system, the occurrence of a dump is indicated only by the captain's depressing the corresponding buttons for the start and completion of the dump. Accordingly, the integrity of the captain is relied upon. Understandably, the captain may forget to depress the events button at the correct time if at all. The reviewer of such data would then simply look for the farthest travelled point, as determined by the two lines-of-position. It is then assumed that the dump occurred at that point. Certainly the dump did not occur at a further point, since the vessel travelled no further. The dump may have occurred earlier, but this is not very likely since there is normally nothing to be gained by dumping early and then travelling further.

The surveillance system of the present invention provides a relatively inexpensive and simple means for monitoring dump missions. The equipment may be housed in a single "black box" which requires electrical connections only to ship's power and to ground, and a simple antenna. Because of the simplicity of this structure, installation is simple and does not require drydocking or costly vessel modification. The system is relatively portable so that it is practical for a system to be temporarily used aboard a vessel which only occasionally needs a monitoring system. Furthermore, no special shore station is required since the Loran stations are already available.

It will be appreciated that the invention may be employed aboard a wide variety of vessels. Self-propelled dumpers would, of course, contain all of the equipment, including any draft sensors. Modern, sophisticated towed barges with large on-board crews and significant power generation capability might also contain all of the on-board equipment for practicing the invention. In applications involving a barge or scow which has limited crew or power available, the towing tug would carry the basic equipment and the barge would carry any draft sensing equipment.

Although a variety of hyperbolic navigation systems are available, the use of a Loran "A" scheme provides the most convenient and reliable system as evidenced by comparative tests with Omega, Decca, Loran "C" systems, as well as radar and radio detection finding systems.

In general, the described system represents a low cost system that provides a high probability of detecting violations. The equipment is readily adaptable to all dump vessels with minimal vessel preparation. The basic system requires no signal transfer between a tug and a towed scow.

While the invention has been described in its preferred embodiment, it is to be understood that the words that have been used are words of description rather than limitation and that changes may be made within the purview of the appended claims without departing from the true scope and spirit of the invention in its broader aspects.

We claim:

1. A system for surveillance of ocean dumping comprising Loran receiver means adapted for mounting on a vessel whose position is to be monitored, means for tuning said receiver means to specified Loran transmitting means, means in said receiver means for providing electrical line-of-position signals representative of the geographical location of the receiver with respect to said transmitting means, command means, a plurality of input means in said command means for providing a print command signal whenever one of said plurality is actuated and an identifying signal indicative of which one of said plurality has been actuated, and recording means for making a permanent record of said line-of-position signals in response to a print command singal, said command means further including clock means for providing a clock signal representative of the time of occurrence of a print command signal, said recording means further including means for permanently recording said identifying and clock signals in response to a print command signal.

2. The apparatus of claim 1 wherein said plurality of input means includes a group of manually actuated input switches individually coupled to separate input terminals on said recording means, each of said switches being further coupled to a common print command input terminal on said recording means.

3. The apparatus of claim 2 further characterized in that said clock means is coupled to an additional input terminal on said recording means.

4. The apparatus of claim 3 wherein said Loran receiver provides first and second line-of-position signals individually coupled to additional input terminals on said recording means, said recording means being constructed to provide a separate record corresponding to each of said input terminals during the occurrence of a print command signal.

5. The apparatus of claim 4 wherein said clock means is further coupled through a frequency dividing means to the Print Command terminal on said recording means so that periodic Print Command signals are supplied to said recording means even in the absence of signals from said switching means.

6. The apparatus of claim 5 wherein said recording means is of the type in which the record is made on a moving paper tape upon which additional handwritten notations may be made where desired.

* * * * *